(12) United States Patent
Rogers et al.

(10) Patent No.: US 7,423,079 B2
(45) Date of Patent: *Sep. 9, 2008

(54) FLAME-RETARDANT SYNTHETIC TEXTILE ARTICLES AND METHODS OF MAKING THE SAME

(75) Inventors: Martin E. Rogers, Blacksburg, VA (US); Janice Paige Phillips, Salem, VA (US); Bryan Koene, Blacksburg, VA (US)

(73) Assignee: Luna Innovations Incorporated, Roanoke, VA (US)

( * ) Notice: Subject to any disclaimer, the term of this patent is extended or adjusted under 35 U.S.C. 154(b) by 449 days.

This patent is subject to a terminal disclaimer.

(21) Appl. No.: 11/130,409

(22) Filed: May 17, 2005

(65) Prior Publication Data

US 2006/0264547 A1 Nov. 23, 2006

(51) Int. Cl.
*C08K 5/49* (2006.01)
(52) U.S. Cl. .................. 524/115; 524/417; 524/556; 525/192; 525/337; 525/340
(58) Field of Classification Search ............. 524/115, 524/417, 556; 525/192, 337, 340
See application file for complete search history.

(56) References Cited

U.S. PATENT DOCUMENTS

| | | | |
|---|---|---|---|
| 5,461,085 A | 10/1995 | Nagatomo et al. | |
| 5,525,703 A | 6/1996 | Kalota | |
| 5,610,220 A * | 3/1997 | Klimmek et al. | 524/417 |
| 5,612,384 A | 3/1997 | Ross et al. | |
| 5,669,894 A | 9/1997 | Goldman et al. | |
| 6,270,893 B1 * | 8/2001 | Young et al. | 428/372 |
| 6,290,887 B1 | 9/2001 | Sheu et al. | |
| 6,562,743 B1 * | 5/2003 | Cook et al. | 442/409 |
| 6,607,994 B2 | 8/2003 | Soane et al. | |
| 7,001,942 B2 * | 2/2006 | Rogers et al. | 524/414 |
| 2005/0203224 A1 * | 9/2005 | Rogers et al. | 524/115 |

FOREIGN PATENT DOCUMENTS

EP 739635 A1 * 10/1996
JP 04306508 A * 10/1992

* cited by examiner

*Primary Examiner*—Ling-Siu Choi
(74) *Attorney, Agent, or Firm*—Nixon & Vanderhye P.C.

(57) ABSTRACT

Synthetic textile articles (e.g., filaments, fibers, yarns, fabrics and the like) and processes of making the same are provided which include flame-retardant SAP particles. The SAP particles are most preferably hydrated with an aqueous flame-retardant solution. In this regard, the flame-retardant solution may consist essentially of water alone or a water solution containing one or more water soluble inorganic flame retardants. When SAP particles are hydrated with an aqueous inorganic flame retardant solution, the SAP particles may thereafter be dried to remove substantially the water component. In such a manner, the inorganic flame retardant will remain as a dried residue physically entrained within the SAP particles. As such, the SAP particles serve as a physical matrix in which the inorganic flame retardant is homogenously dispersed. The SAP particles may then be chemically or physically affixed to the textile article in an amount sufficient to render the article flame-retardant.

19 Claims, 2 Drawing Sheets

US 7,423,079 B2

FLAME-RETARDANT SYNTHETIC TEXTILE ARTICLES AND METHODS OF MAKING THE SAME

FIELD OF THE INVENTION

Figure 1:
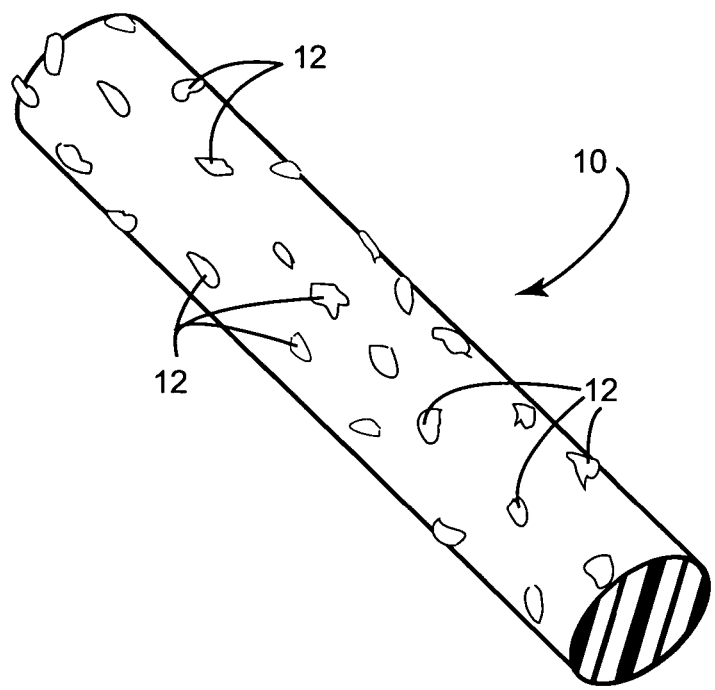

The present invention relates generally to textile articles, for example, fibers, filaments, yarns and fabric structures formed of the same, which exhibit flame-retardant properties. In especially preferred embodiments, the present invention relates to textile articles which include a flame-retardant effective amount of flame-retardant superabsorbent polymer (SAP) particles associated therewith.

DEFINITIONS

The terms below as used herein and in the accompanying claims are intended to have the following definitions.

"Filament" means a fibrous strand of extreme or indefinite length.

"Fiber" means a fibrous strand of definite length, such as a staple fiber.

"Yarn" means a collection of numerous filaments or fibers which may or may not be textured, spun, twisted or laid together.

"Fabric" means a collection of filaments, fibers and/or yarns which form an article having structural integrity. A fabric may thus be formed by means of conventional weaving, braiding, knitting, warp-knit weft insertion, spinbonding, melt blowing techniques to form structurally integrated masses of filaments, fibers and/or yarns.

"Textile articles" is used generically to refer to filaments, fibers, yarns and fabrics. For convenience, the discussion below will reference textile articles, it being understood that such reference embraces filaments, fibers, yarns and fabrics.

"Functionalized" when referring to textile articles means that such textile articles have been imbued with a desired function which such textile article may not inherently possess without such imbuement. Certain functions that textile articles may be imbued with include, for example, flame retardancy, anti-microbial properties, anti-static properties, and the like.

"Flame retardant" means that the initiation and/or spread of flame or smoke slowed or prevented entirely by inhibiting the combustion reaction in the flame.

"Synthetic" means that the textile article is man-made from a fiber-forming substance including polymers synthesized from chemical compounds, modified or transformed natural polymers, and minerals. Synthetic fibers are thus distinguishable from natural fibers such as cotton, wool, silk and flax.

"Spinnable" is meant to refer to a liquid material which is capable of being extruded through orifices in a spinneret to form individual streams of the material which when solidified ultimately result in individual fibers of such material.

BACKGROUND AND SUMMARY OF THE INVENTION

It is often desirable to impart to textile articles certain functional attributes. For example, while textile articles formed from some synthetic polymeric materials (e.g., polyarylene sulfides) are themselves flame resistant, there is a continual need to improve the flame retardant properties thereof. Imparting flame-retardant attributes to synthetic filaments and fibers can typically be accomplished by incorporating an appropriate flame-retardant material physically or chemically within the polymeric material prior to being formed into a textile article and/or to apply an appropriate functional component topically to the textile article by treating the textile article in a post-production step. The present invention relates to the latter technique for imparting flame-retardant attributes to textile articles, namely by the topical application of particulate flame-retardant materials adhered or bound to the surface thereof.

One of the main difficulties with current fibers in textiles, whether they are natural (e.g. cotton) or synthetic (polyester, nylon) is that they readily burn. To preserve lives and property, it is critical to reduce the flammability of textiles. Most flame retardants in use today are added as fillers or contain halogens. Fillers can reduce the physical properties of the clothing, and are not bound to the fiber. Halogenated flame retardants have environmental concerns as well as release highly toxic gases during combustion. New non-halogenated flame retardants with minimal environmental impact and improved physical properties are needed for textiles.

Recently, U.S. Pat. No. 6,607,994 to Soane et al (the entire content of which is expressly incorporated hereinto by reference) has disclosed nanoparticle-based permanent treatments for textiles. More particularly, an agent or other payload is disclosed therein as being surrounded by or contained within a polymeric encapsulator that is reactive to webs to give textile reactive nanoparticles. As best as applicants can determine there is no disclosure therein of employing superabsorbent polymeric (SAP) particles as the encapsulator and/or modification of the SAP particles to achieve bonding to a textile article.

U.S. Pat. No. 6,290,887 to Sheu et al (the entire content of which is expressly incorporated hereinto by reference), superabsorbent polymer (SAP) particles pre-loaded with moisture have been incorporated into a thermoplastic polymer (e.g., polyethylene) so as to obtain a SAP-enriched plastics material that may be extruded into desired shapes (e.g., as an outer jacket of a telecommunications cable).

It would therefore be desirable if flame-retardant SAP could be associated with textile articles so as to impart flame-retardant properties thereto. It is toward providing fulfilling such a need that the present invention is directed.

Broadly, the present invention is embodied in textile articles and processes of making the same whereby flame-retardant SAP particles are associated with textile articles so as to impart flame-retardant properties to the thereto. The SAP particles are most preferably hydrated with an aqueous flame-retardant solution. In this regard, the flame-retardant solution may consist essentially of water alone or a water solution containing one or more water soluble inorganic flame retardants.

When SAP particles are hydrated with an aqueous inorganic flame retardant solution, the SAP particles may thereafter be dried to remove substantially the water component. In such a manner, the inorganic flame retardant will remain as a dried residue physically entrained within the SAP particles. As such, the SAP particles serve as a physical matrix in which the inorganic flame retardant is homogenously dispersed. The SAP particles may then be blended with a synthetic resin as is or alternatively may be ground into more finely divided particles which contain the dried residue of the aqueous inorganic flame retardant solution and then blended with a suitable synthetic resin.

These and other aspects and advantages will become more apparent after careful consideration is given to the following detailed description of the preferred exemplary embodiments thereof.

BRIEF DESCRIPTION OF THE ACCOMPANYING DRAWINGS

Figure 2:
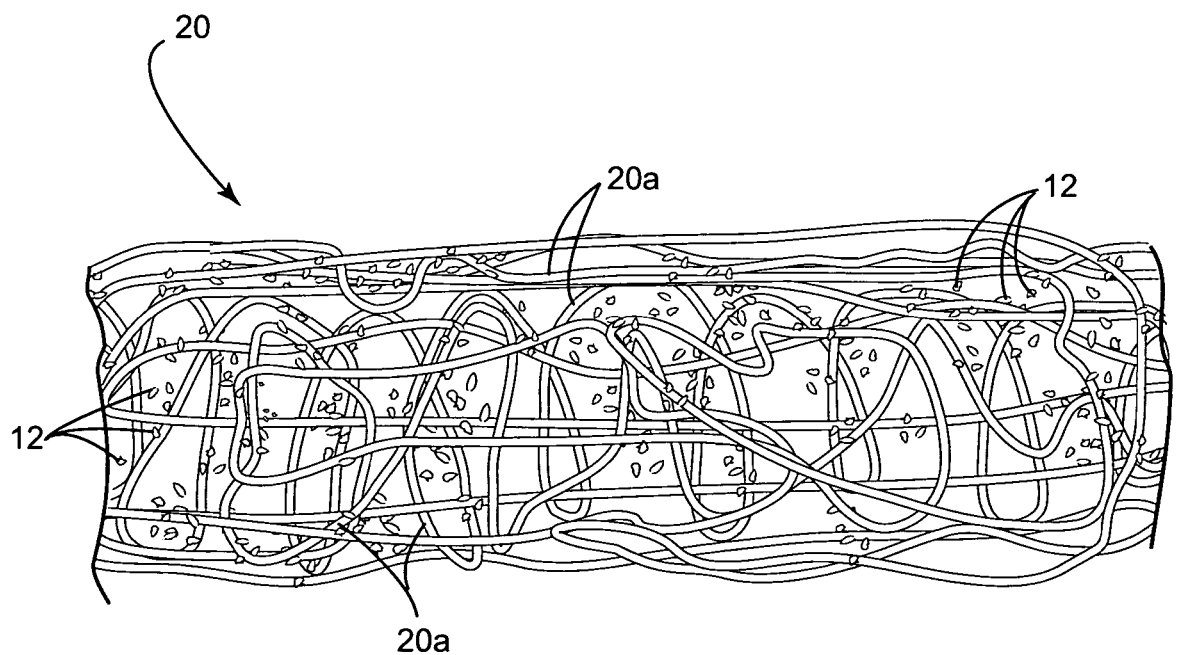
Figure 3:
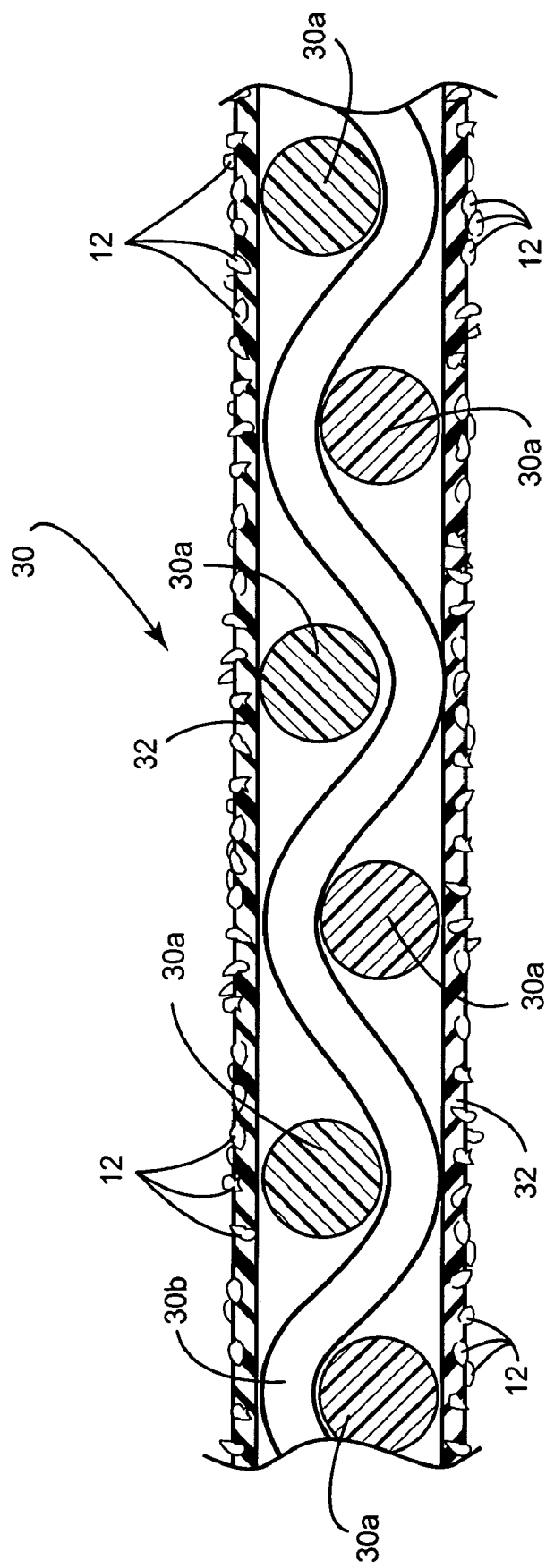

Reference will be made to the accompanying drawings, wherein like reference numerals throughout the various FIGURES denote like structural elements, and wherein, FIG. 1 is schematic view of a synthetic fiber which includes flame-retardant SAP particles attached to an exterior surface thereof;

FIG. 2 is a schematic cross-sectional view of a non-woven textile fabric having flame-retardant SAP particles entrapped therewithin; and FIG. 3 is a schematic cross-sectional view of a woven textile fabric having flame-retardant SAP particles bonded thereto by means of a binder material.

DETAILED DESCRIPTION OF THE INVENTION

The present invention necessarily includes flame-retardant superabsorbent polymer (SAP) particles. In this regard, superabsorbent polymers are, in and of themselves, well known and have the ability to absorb many times their weight in water. Virtually any SAP may be employed in the practice of the present invention. For example, SAP as disclosed in U.S. Pat. Nos. 5,461,085; 5,525,703; 5,612,384 and/or 5,669,894 (the entire contents of each patent being incorporated expressly hereinto by reference) may be employed. SAPs are available commercially in a variety of chemical forms, including substituted and unsubstituted natural and synthetic polymers, such as hydrolysis products of starch acrylonitrile graft polymers, carboxymethylcellulose, cross-linked polyacrylates, sulfonated polystyrenes, hydrolyzed polyacrylamides, polyvinyl alcohols, polyethylene oxides, polyvinylpyrrolidones, polyacrylonitriles and the like.

SAP is typically provided in the form of particles. As used herein, the term "SAP particles" and like terms mean granules, fibers, flakes, spheres, powders, platelets, and/or other solid shapes and forms known to those skilled in the SAP art. SAP particles having a nominal particle size of less than about 100 microns (e.g., between about 0.20 micron to about 50 microns, and more preferably between about 0.50 micron to about 10 microns), to up to about 500 microns (e.g., between about 100 to about 500 microns) may be employed in the practice of the present invention. As used herein, the term "nominal particle size" means the size of a particle capable of passing through a screen of a stated mesh size. The SAP particles may be ground to a more finely divided particulate form so as to achieve the desired nominal particle size. For example, dried SAP particles containing the residue of a water-soluble inorganic flame retardant may first be ground to a nominal particle size of about 300 microns or less prior to being associated with a textile article in a flame-retardant effective amount in accordance with the present invention.

The SAP particles employed in the practice of the present invention are most preferably hydrated. By the term "hydrated SAP particles" is meant that the SAP particles are in a hydrated state in that the SAP particles have absorbed at least 5% of their own weight, and usually several times their weight, in water. Conversely, the term "dried SAP particles" is meant to refer to SAP particles that have previously been hydrated, but which have subsequently been dried to a water absorption content of less than 5%, and typically less than 3%, of the their own weight. Exemplary hydrated SAP particles incorporated into thermoplastics that may be employed in the practice of the present invention are disclosed, for example U.S. Pat. No. 6,290,887 to Sheu et al, the entire content of which is expressly incorporated hereinto by reference.

The SAP particles may be hydrated with a flame-retardant effective amount of an aqueous solution containing one or more inorganic flame retardants as described more fully in U.S. Pat. No. 7,001,942, the entire content of which is expressly incorporated hereinto by reference. Most preferably, the inorganic flame retardants are water-soluble so that they may be dissolved in water to form an aqueous inorganic flame retardant solution that may then be absorbed by the SAP particles. Once absorbed, the SAP particles may be dried to remove the water thereby leaving the inorganic flame retardant physically within the SAP particles as a dried residue of the aqueous inorganic flame retardant solution. By the term "dried residue" is meant that the solute (e.g., the inorganic flame retardant) remains physically following evaporation or removal of water. By the term "water soluble" is meant that at least about 1 g of solute per 100 cc of water, more preferably at least about 10 g of solute per 100 cc of water, dissolves.

Specific examples of water-soluble inorganic flame retardants that may be employed in the practice of the present invention include boric acid (ortho and tetra), sodium tetraborate and hydrate, sodium metaborate and hydrates, zinc borate, phosphoric acid and sodium salt derivatives thereof, phosphorous acid and sodium salt derivatives thereof, ammonium orthophosphate, ammonium hypophosphate, ammonium hydrogen phosphate, ammonium dihydrogen phosphate, ammonium hypophosphite, ammonium dihydrogen orthophosphite, ammonium sulfamate, ammonium bromide, ammonium sulfate, and sodium tungstate. Most preferably, the inorganic flame retardant is present in the SAP particles in an amount of between about 1 to about 500 wt. %, more preferably between about 25 wt. % to about 200 wt. %, based on the total weight of the flame-retardant SAP particles. The flame retardants may be used singly or as combinations of two or more of the same.

The flame-retardant SAP particles may be physically associated with a textile article by chemical or physical means. For example, the flame-retardant SAP particles may be modified so as to include one or more pendant reactive groups which serve as sites to react with, and be chemically bound (linked) to, the textile article. The pendant reactive groups of such modified SAP particles may be virtually any group or groups capable of reacting with functional groups present in the textile article. Examples of the reactive groups provided with modified SAP in accordance with the present invention include, for example, acrylics, methacrylics, styryls, epoxies (oxirane), isocyanates, aromatic alcohols, thiols, carboxylic acids, hydroxyls, amines, and like groups.

The flame-retardant SAP particles may alternatively or additionally be incorporated into the small interstices of a non-woven or woven textile fabric and thereby be held physically within the fabric. Again alternatively or additionally, the flame-retardant SAP particles may be bonded to the textile article by means of a binder, e.g., a binder resin.

Examples of binder resins that may be used satisfactorily in accordance with the present invention include acrylics, urethanes, unsaturated polyesters, vinyl esters, epoxies, phenol/formaldehyde resins, urea/formaldehyde resins and melamine/formaldehyde resins; crosslinkable acrylic resins derived from substituted acrylates such as epoxy acrylates, hydroxy acrylates, isocyanato acrylates, urethane acrylates or polyester acrylates; alkyd resins, polyester resins and acrylate resins crosslinked with melamine resins, urea resins, isocyanates, isocyanurates, carbamates or epoxy resins.

Once prepared, the flame-retardant SAP particles may be applied to the surfaces of the textile article in any convenient manner. For example, if the flame-retardant SAP particles are blended with a binder resin, the blend may be applied as a liquid onto the surface of the textile article by padding, dipping, spraying, roll coating or like techniques. If the textile article is in the form of a filament, fiber and/or yarn, the blend of binder resin and SAP particles may be applied continuously during the production of such filaments, fibers or yarns by means of a conventional roll coating applicator. The flame-retardant SAP particles may also be sprinkled or otherwise applied during formation of a non-woven or woven textile article so that the particles will be physically captured within, and thus retained by, the fabric's interstitial spaces.

The flame-retardant SAP particles will be present in an amount sufficient to render the textile article flame-retardant. Preferably, the flame-retardant SAP particles will be present in an amount between about 0.1 wt. % to about 50 wt. %, more preferably between about 1 wt. % to about 20 wt. %, and most preferably between about 2 wt. % to about 15 wt. %, based on the total weight of the textile article.

The textile article may be formed of any spinnable synthetic material. Thus, melt-spinnable thermoplastic polymeric materials such as polyamides (e.g., nylons), copolyamides, polyesters such as polymer and copolymers formed from poly(ethylene)terephthalic acid, polyolefins such as polyethylene and polypropylene, and polyurethanes. Both heterogeneous and homogeneous mixtures of such polymers may also be used. Solution spinnable synthetic materials (i.e., those materials capable of being spun using wet or dry spinning procedures) may also be employed to form the textile materials of the present invention. Suitable solution spinnable synthetic materials include acetates, triacetates, acrylics, rayon, aramids, modacrylics, polyvinylchloride (PVC), polybenzimidazole (PBI) and segmented polyurethanes (e.g., spandex).

Accompanying FIGS. 1-3 depict schematically several exemplary textile articles in accordance with the present invention. In this regard, FIG. 1 schematically shows a synthetic fiber 10 to which flame-retardant SAP particles are attached to its outer surface (a representative few of such SAP particles being identified by reference numeral 12). In this regard, as depicted, the SAP particles 12 may be attached chemically or physically (e.g., via a binder resin) to the outer surface of the fiber 10.

FIG. 2 depicts schematically a non-woven fabric 20 comprised of an assembly of textile fibers or filaments 20a held together by mechanical interlocking in a random web. The individual fibers or filaments 20a may or may not be fused or bonded at their crossing points by means well known to those of ordinarily skill in the art (e.g., by bonding with a binder or to fuse adjacent fibers or filaments using heat or by with a solvent). An amount of the flame-retardant SAP particles 12 is therefore entrapped physically within the interstices of the fabric 20 sufficient to render it flame-retardant, which entrapment may or may not be further aided by means of a binder.

The woven fabric 30 is comprised of warp and weft filaments 30a and 30b depicted in accompanying FIG. 3 includes an amount of the flame-retardant SAP particles 12 bound to upper and lower surfaces thereof by means of a binder resin layer 32. Of course, the particles 12 could likewise be bound via the binder resin layer 32 on only one surface thereof and/or may be present within the interstices of the fabric 30, in which case a binder resin may or may not be present.

The present invention will be further understood by reference to the following non-limiting Examples.

EXAMPLE 1 (COMPARATIVE)

A piece of fabric (polyester/cotton blend) measuring 2 inches by 8 inches was immersed in a binder solution (90/10 water/blocked isocyanate (HYDROPHOBOL XAN)). The excess solution was pressed from the fabric and the fabric was dried for 5 minutes at 170° C. The fabric was suspended from a copper wire and the flame of a propane torch was applied to the bottom of the fabric for five seconds. The fabric ignited and the flame spread up the fabric consuming the entire piece. Only ashes remained.

EXAMPLE 2 (INVENTION)

Example 1 above was repeated except that the binder solution in which the fabric piece was immersed included 20% by weight of flame-retardant polyacrylamide SAP microspheres containing diammonium phosphate. The excess solution was pressed from the fabric piece and the fabric piece was dried for 5 minutes at 170° C. The fabric was suspended from a copper wire and the flame of a propane torch was applied to the bottom of the fabric for five seconds. Upon removal of the torch, the fabric extinguished immediately. The fabric piece could not be ignited by further application of the torch to its bottom.

While the present invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A flame-retardant synthetic textile article comprising a textile article, and a flame-retardant effective amount of flame-retardant superabsorbent polymer (SAP) particles which are comprised of SAP particles and an amount between about 25 wt. % to about 500 wt. %, based on the total weight of the flame-retardant SAP particles, of an inorganic flame retardant absorbed by and physically entrained within the SAP particles.

2. The flame-retardant article of claim 1, wherein the flame-retardant SAP particles comprise SAP particles hydrated with an aqueous inorganic flame-retardant solution absorbed by and physically entrained within the SAP particles.

3. The flame-retardant article of claim 1, wherein the flame-retardant SAP particles comprise a dried residue of an aqueous inorganic flame retardant solution absorbed by and physically entrained within the SAP particles.

4. The flame-retardant article as in claim 1, wherein the inorganic flame retardant includes at least one phosphorus-containing flame retardant.

5. The flame-retardant article as in claim 4, wherein the phosphorus-containing flame retardant is at least one selected from the group consisting of phosphoric acid and sodium salt derivatives thereof, phosphorous acid and sodium salt derivatives thereof, ammonium orthophosphate, ammonium hypophosphate, ammonium hydrogen phosphate, ammonium dihydrogen phosphate, ammonium hypophosphite, and ammonium dihydrogen orthophosphite.

6. The flame-retardant article as in claim 1, wherein the inorganic flame retardant is at least one selected from the group consisting of boric acid, sodium tetraborate and hydrates thereof, sodium metaborate and hydrates thereof, and zinc borate.

7. The flame-retardant article as in any one of claims 1-6, wherein the inorganic flame retardant is present in an amount of between about 25 wt. % to about 200 wt. %, based on the total weight of the flame-retardant SAP particles.

8. The flame-retardant article as in claim 1, wherein the flame-retardant SAP particles comprise hydrated SAP particles.

9. The flame-retardant article of claim 1, wherein the article is in the form of a synthetic filament, fiber, yarn or fabric.

10. A method of making a flame-retardant synthetic textile article comprising affixing an effective amount of flame-retardant superabsorbent polymer (SAP) particles to the textile article, wherein the flame-retardant SAP particles comprise SAP particles and an amount between about 25 wt. % to about 500 wt. %. based on the total weight of the flame-retardant SAP particles, of an inorganic flame retardant absorbed by and physically entrained within the SAP particles.

11. The method as in claim 10, wherein the flame-retardant SAP particles are comprised of SAP particles containing a dried residue of an aqueous inorganic flame retardant solution.

12. The method as in claim 10, comprising chemically binding the flame-retardant SAP particles to the textile article.

13. The method as in claim 10, comprising binding the flame-retardant SAP particles to the textile article with a binder resin.

14. The method as in claim 10, comprising entrapping the flame-retardant SAP particles within interstices of the textile article.

15. The method as in claim 11, wherein the inorganic flame retardant includes at least one phosphorus-containing flame retardant.

16. The method as in claim 15, wherein the inorganic flame retardant is at least one selected from the group consisting of phosphoric acid and sodium salt derivatives thereof, phosphorous acid and sodium salt derivatives thereof, ammonium orthophosphate, ammonium hypophosphate, ammonium hydrogen phosphate, ammonium dihydrogen phosphate, ammonium hypophosphite, and ammonium dihydrogen orthophosphite.

17. The method as in claim 11, wherein the inorganic flame retardant is at least one selected from the group consisting of boric acid, sodium tetraborate and hydrates thereof, sodium metaborate and hydrates thereof, and zinc borate.

18. The method as in any one of claims 10-17, wherein the inorganic flame retardant is present in an amount of between about 25 wt. % to about 200 wt. %, based on the total weight of the flame-retardant SAP particles.

19. The method as in claim 10, wherein the article is in the form of a synthetic filament, fiber, yarn or fabric.

* * * * *